(12) United States Patent
Wu et al.

(10) Patent No.: US 12,557,166 B2
(45) Date of Patent: Feb. 17, 2026

(54) METHOD AND APPARATUS FOR PATH SWITCH IN A WIRELESS COMMUNICATION SYSTEM

(71) Applicant: Lenovo (Beijing) Limited, Beijing (CN)

(72) Inventors: Lianhai Wu, Beijing (CN); Congchi Zhang, Shanghai (CN); Mingzeng Dai, Shanghai (CN); Ran Yue, Beijing (CN); Jie Shi, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 375 days.

(21) Appl. No.: 18/257,947

(22) PCT Filed: Dec. 18, 2020

(86) PCT No.: PCT/CN2020/137611
§ 371 (c)(1),
(2) Date: Jun. 16, 2023

(87) PCT Pub. No.: WO2022/126599
PCT Pub. Date: Jun. 23, 2022

(65) Prior Publication Data
US 2024/0107611 A1    Mar. 28, 2024

(51) Int. Cl.
*H04W 76/20*    (2018.01)
*H04W 36/00*    (2009.01)
(Continued)

(52) U.S. Cl.
CPC ....... *H04W 76/20* (2018.02); *H04W 36/0055* (2013.01); *H04W 60/06* (2013.01); *H04W 76/19* (2018.02); *H04W 92/18* (2013.01)

(58) Field of Classification Search
CPC ............. H04W 76/20; H04W 36/0055; H04W 60/06; H04W 76/19; H04W 92/18; H04W 88/04
See application file for complete search history.

(56) References Cited

U.S. PATENT DOCUMENTS

2018/0213577 A1*   7/2018  Burbidge .............. H04W 76/10
2019/0313315 A1    10/2019 Xu et al.
(Continued)

FOREIGN PATENT DOCUMENTS

| CN | 102164385 A | 8/2011 |
| CN | 102413527 A | 4/2012 |

(Continued)

OTHER PUBLICATIONS

PCT/CN2020/137611, "International Preliminary Report on Patentability", PCT Application No. PCT/CN2020/137611, Jun. 29, 2023, 5 pages.
(Continued)

*Primary Examiner* — Ashley Shivers
(74) *Attorney, Agent, or Firm* — FIG. 1 Patents

(57) ABSTRACT

Embodiments of the present disclosure relate to methods and apparatuses for path switch in a wireless communication system. According to some embodiments of the disclosure, a method may include: receiving, at a UE, an RRC reconfiguration message from a BS via a source Uu link, wherein the RRC reconfiguration message includes a path switch indication indicating a switch to a target relay; and in response to the RRC reconfiguration message, transmitting an RRC reconfiguration complete message to the BS via the target relay, initiating a reestablishment procedure over a Uu interface, or falling back to the source Uu link. The method may further include: in response to the RRC reconfiguration message, detaching or maintain the source Uu link.

20 Claims, 9 Drawing Sheets

(51) Int. Cl.
*H04W 60/06* (2009.01)
*H04W 76/19* (2018.01)
*H04W 92/18* (2009.01)

(56) References Cited

U.S. PATENT DOCUMENTS

2019/0387446 A1* 12/2019 Xu ................... H04W 36/0061
2021/0289391 A1* 9/2021 Paladugu .............. H04W 88/04
2023/0363020 A1* 11/2023 Back .................. H04W 36/324

FOREIGN PATENT DOCUMENTS

| CN | 108605379 A | 9/2018 |
| EP | 1852984 A2 | 11/2007 |
| EP | 3637940 A1 | 4/2020 |
| WO | 2009110689 A2 | 9/2009 |
| WO | 2021155839 A1 | 8/2021 |

OTHER PUBLICATIONS

PCT/CN2020/137611, "International Search Report and Written Opinion", PCT Application No. PCT/CN2020/137611, Sep. 18, 2021, 6 pages.

20965615.6 , "Extended European Search Report", EP Application Number, Aug. 12, 2024, 11 pages.

* cited by examiner

METHOD AND APPARATUS FOR PATH SWITCH IN A WIRELESS COMMUNICATION SYSTEM

TECHNICAL FIELD

Embodiments of the present disclosure generally relate to wireless communication technology, especially to path switch in a wireless communication system.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In the above wireless communication systems, a user equipment (UE) may communicate with another UE via a data path supported by an operator's network, e.g., a cellular or a Wi-Fi network infrastructure. The data path supported by the operator's network may include a base station (BS) and multiple gateways.

Some wireless communication systems may support sidelink communications, in which devices (e.g., UEs) that are relatively close to each other may communicate with one another directly via a SL, rather than being linked through the BS. A relaying function based on a sidelink may be supported in a communication network. For example, a UE supporting sidelink communication may function as a relay node to extend the coverage of a BS. An out-of-coverage UE may communicate with a BS via a relay UE. In the context of the present disclosure, a UE, which functions as a relay between another UE and a BS, may be referred to a UE-to-network relay or a U2N relay.

There is a need for efficiently performing communication in a communication system supporting a U2N relay.

SUMMARY

Some embodiments of the present disclosure provide a method. According to some embodiments of the present disclosure, the method may include: receiving, at a UE, an RRC reconfiguration message from a BS via a source Uu link, wherein the RRC reconfiguration message includes a path switch indication indicating a switch to a target relay; and in response to the RRC reconfiguration message, transmitting an RRC reconfiguration complete message to the BS via the target relay, initiating a reestablishment procedure, or falling back to the source Uu link.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

Embodiments of the present disclosure provide technical solutions for path switch, and can facilitate and improve the implementation of various communication technologies such as 5G NR. For example, embodiments of the present disclosure provide technical solutions for path switch of a UE from a source Uu link to a relay link.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principle of the present disclosure.

Figure 1:
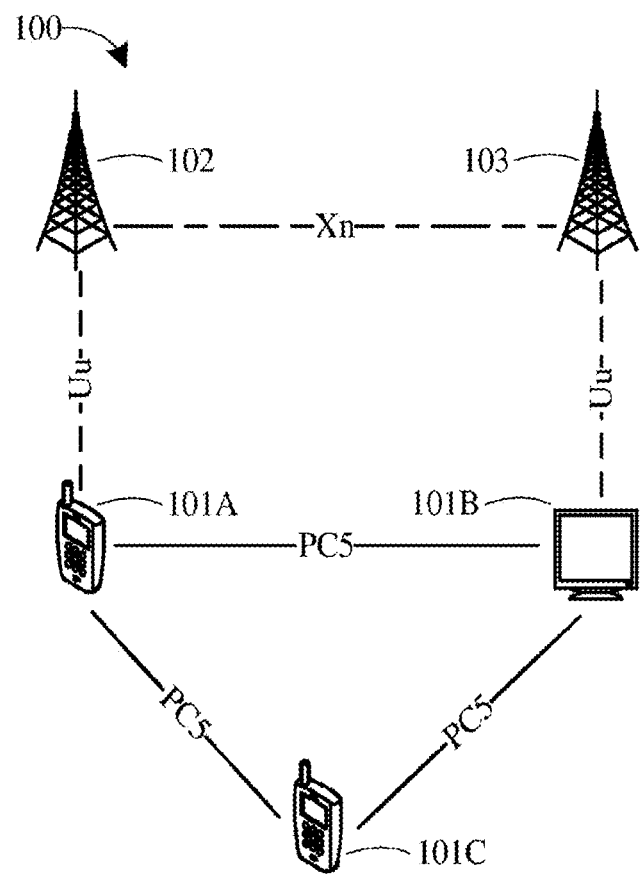
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, the wireless communication system 100 may support sidelink communications. Sidelink communication supports a UE-to-UE direct communication. In the context of the present disclosure, sidelink communications may be categorized according to the wireless communication technologies adopted. For example, sidelink communication may include NR sidelink communication and V2X Sidelink communication.

NR sidelink communications (e.g., specified in 3GPP specification TS 38.311) may refer to access stratum (AS) functionality enabling at least vehicle-to-everything (V2X) communications as defined in 3GPP specification TS 23.287 between neighboring UEs, using NR technology but not traversing any network node. V2X sidelink communications (e.g., specified in 3GPP specification TS 36.311) may refer to AS functionality enabling V2X communications as defined in 3GPP specification TS 23.285 between neighboring UEs, using evolved-universal mobile telecommunication system (UMTS) terrestrial radio access (UTRA) (E-UTRA) technology, but not traversing any network node. However, if not being specified, "sidelink communications" may refer to NR sidelink communications, V2X sidelink communications, or any sidelink communications adopting other wireless communication technologies.

Referring to FIG. 1, the wireless communication system 100 may include some base stations (e.g., BS 102 and BS 103) and some UEs (e.g., UE 101A, UE 101B, and UE 101C). Although a specific number of UEs and BSs is depicted in FIG. 1, it is contemplated that any number of UEs and BSs may be included in the wireless communication system 100.

The UEs and the BSs may support communication based on, for example, 3G, long-term evolution (LTE), LTE-advanced (LTE-A), new radio (NR), or other suitable protocol(s). In some embodiments of the present disclosure, a BS (e.g., BS 102 or BS 103) may be referred to as an access point, an access terminal, a base, a base unit, a macro cell, a Node-B, an evolved Node B (eNB), a gNB, an ng-eNB, a Home Node-B, a relay node, or a device, or described using other terminology used in the art. A UE (e.g., UE 101A, UE 101B, or UE 101C) may include, for example, but is not limited to, a computing device, a wearable device, a mobile device, an IoT device, a vehicle, etc. Persons skilled in the art should understand that as technology develops and advances, the terminologies described in the present disclosure may change, but should not affect or limit the principles and spirit of the present disclosure.

In the example of FIG. 1, the BS 102 and the BS 103 may be included in a next generation radio access network (NG-RAN). In some embodiments of the present disclosure, the BS 102 may be a gNB and the BS 103 may be an ng-eNB.

The UE 101A and UE 101B may be in-coverage (e.g., inside the NG-RAN). For example, as shown in FIG. 1, the UE 101A may be within the coverage of BS 102, and the UE 101B may be within the coverage of BS 103. The UE 101C may be out-of-coverage (e.g., outside the coverage of the NG-RAN). For example, as shown in FIG. 1, the UE 101C may be outside the coverage of any BSs, for example, both the BS 102 and BS 103. The UE 101A and UE 101B may respectively connect to the BS 102 and BS 103 via a network interface, for example, the Uu interface as specified in 3GPP standard documents. The control plane protocol stack in the Uu interface may include a radio resource control (RRC) layer, which may be referred to as a Uu RRC. The link established between a UE (e.g., UE 101A) and a BS (e.g., BS 102) may be referred to as a Uu link. The BS 102 and BS 103 may be connected to each other via a network interface, for example, the Xn interface as specified in 3GPP standard documents. The UE 101A, UE 101B, and UE 101C may be connected to each other respectively via, for example, a PC5 interface as specified in 3GPP standard documents. The control plane protocol stack in the PC5 interface may include a radio resource control (RRC) layer, which may be referred to as a PC5 RRC. The link established between two UEs (e.g., UE 101A and UE 101B) may be referred to as a PC5 link.

Support for V2X services via the PC5 interface can be provided by, for example, NR sidelink communication and/or V2X sidelink communication. NR sidelink communication can support one of the following three types of transmission modes for a pair of a source Layer-2 identity and a destination Layer-2 identity: unicast transmission, groupcast transmission, and broadcast transmission. Sidelink communication transmission and reception over the PC5 interface are supported when the UE is either in-coverage or out-of-coverage. For example, the UE 101A, which is within the coverage of the BS 102, can perform sidelink transmission and reception (e.g., sidelink unicast transmission, sidelink groupcast transmission, or sidelink broadcast transmission) over a PC5 interface. The UE 101C, which is outside the coverage of both the BS 102 and BS 103, can also perform sidelink transmission and reception over a PC5 interface.

A UE which supports sidelink communication and/or V2X communication may be referred to as a V2X UE. A V2X UE may be a cell phone, a vehicle, a roadmap device, a computer, a laptop, an IoT (internet of things) device or other type of device in accordance with some other embodiments of the present disclosure.

As mentioned above, the relaying function based on a sidelink may be supported in a communication network. In some embodiments of the present disclosure, a UE-to-network relay is supported. For example, an in-coverage UE in communication with an out-of-coverage UE may function as a relay UE between the serving BS of the in-coverage UE and the out-of-coverage UE. In some embodiments of the present disclosure, a UE-to-UE relay is supported. For example, a UE in communication with two or more UEs (e.g., first and third UEs) may function as a relay UE, such that the first UE may communicate with the third UE via the relay UE.

Figure 2:
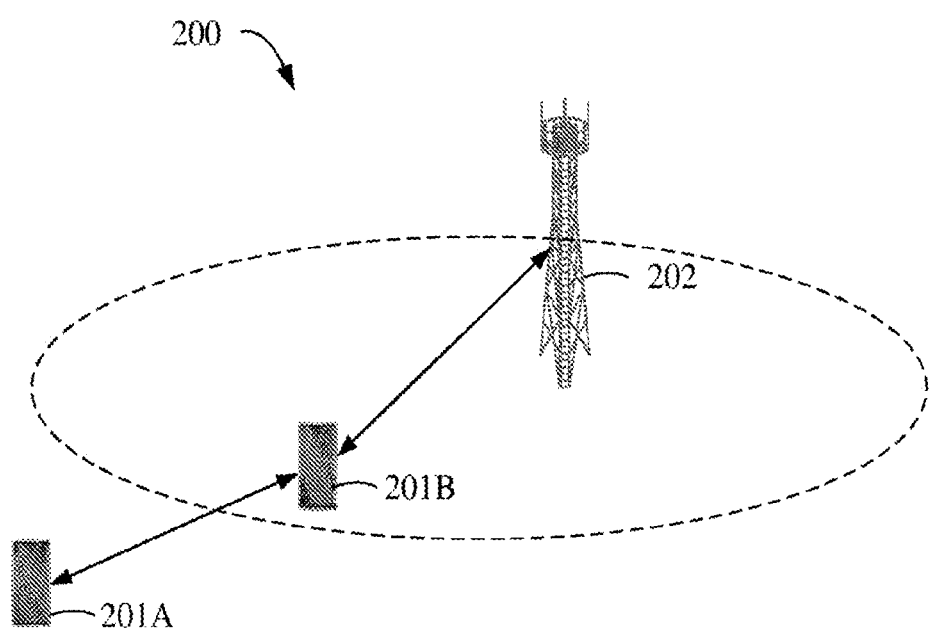
FIG. 2 illustrates a schematic diagram of a wireless communication system in accordance with some embodiments of the present disclosure.

FIG. 2 illustrates a schematic diagram of a wireless communication system 200 in accordance with some embodiments of the present disclosure.

As shown in FIG. 2, the wireless communication system 200 may include a BS (e.g., BS 202) and some UEs (e.g., UE 201A and UE 201B). Although a specific number of UEs and BS is depicted in FIG. 2, it is contemplated that any number of UEs may be included in the wireless communication system 200.

Referring to FIG. 2, UE 201B may be within the coverage of BS 202. UE 201B and BS 202 may establish an RRC connection therebetween. UE 201A may be outside of the coverage of BS 202. In some examples, UE 201B may function as UE 101A or UE 101B shown in FIG. 1, and UE 201A may function as UE 101C shown in FIG. 1.

The wireless communication system 200 may support sidelink communications. For example, UE 201B may be in sidelink communication with UE 201A. A PC5 RRC connection may be established between UE 201A and UE 201B. In some embodiments of the present disclosure, UE 201A may initiate a procedure for establishing connection with BS 202 via UE 201B (i.e., UE-to-network relay). For example, UE 201A may transmit an RRC setup request to BS 202 via UE 201B. BS 202 may transmit an RRC setup message including a response to UE 201A via UE 201B. After such procedure, UE 201A may access BS 202 via UE 201B. UE 201A and BS 202 may establish an RRC connection therebetween, and UE 201A may have RRC states, such as an RRC_IDLE state, an RRC_INACTIVE state, and an RRC_CONNECTED state. UE 201A may also be referred to as a remote UE and UE 201B may also be referred to as a relay UE.

It should be appreciated by persons skilled in the art that although a single relay node between UE 201A and BS 202 is depicted in FIG. 2, it is contemplated that any number of relay nodes may be included.

Figure 3:
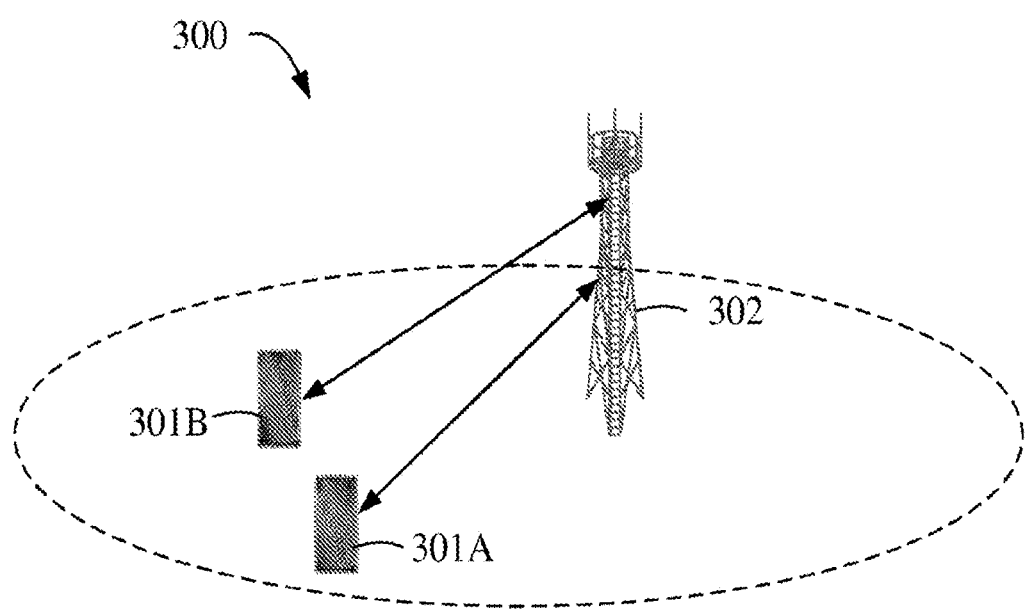
FIG. 3 illustrates a schematic diagram of a wireless communication system in accordance with some embodiments of the present disclosure.

FIG. 3 illustrates a schematic diagram of a wireless communication system 300 in accordance with some embodiments of the present disclosure.

As shown in FIG. 3, the wireless communication system 300 may include a BS (e.g., BS 302) and some UEs (e.g., UE 301A and UE 301B). Although a specific number of UEs and BS is depicted in FIG. 3, it is contemplated that any number of UEs may be included in the wireless communication system 300.

Referring to FIG. 3, UE 301A and UE 301B may be within the coverage of BS 302. Each of UE 301A and UE 301B may establish a respective RRC connection with BS 302. In some examples, UE 301A and UE 301B may function as UE 101A or UE 101B shown in FIG. 1, or UE 101B shown in FIG. 2.

Under certain circumstances, for example, when UE 301A moves to the edge of the coverage area of BS 302, BS 302 may determine to switch UE 301A from the source Uu link to a relay link. For example, BS 302 may instruct 301A to establish a connection with UE 301B. UE 301A may then access BS 302 via UE 301B (for example, similar to FIG. 2 where UE 201A may access BS 202 via UE 201B). Embodiments of the present disclosure provide solutions for performing such path switch procedure.

Figure 4:
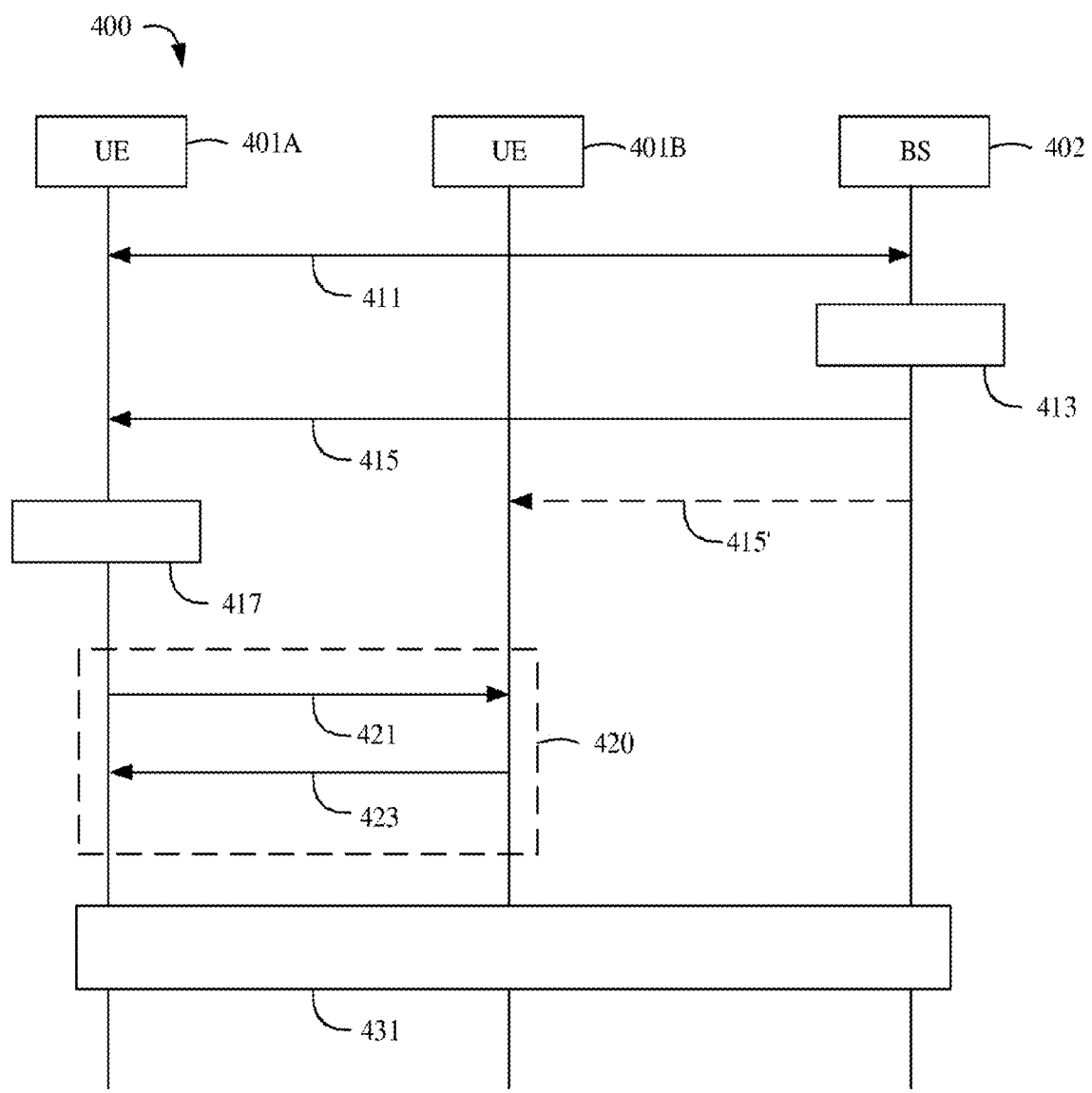
FIG. 4 illustrates an exemplary path switch procedure in accordance with some embodiments of the present disclosure.

FIG. 4 illustrates an exemplary path switch procedure 400 in accordance with some embodiments of the present disclosure. Details described in all of the foregoing embodiments of the present disclosure are applicable for the embodiments shown in FIG. 4.

Referring to FIG. 4, at the beginning, both UE 401A and UE 401B are accessing BS 402. UE 401A may be configured with a measurement configuration by BS 402. In operation 411, UE 401A may report corresponding measurement results to BS 402.

In some embodiments of the present disclosure, UE 401A may report at least one candidate relay UE (e.g., UE 401B) based on the measurement configuration. In some examples, UE 401A may report the candidate relay UE(s) after UE 401A measures and/or discovers the candidate relay UE(s). In some examples, the report may indicate at least one of: an identity (ID) of the at least one candidate relay UE, sidelink channel quality (e.g., reference signal received power (RSRP)) information between UE 401A and the at least one candidate relay UE, whether a PC5 link with (some or all of) the at least one candidate relay UE has been established or not. For example, UE 401A may report the ID of UE 401B, the sidelink channel quality information between UE 401A and UE 401B, and/or whether a PC5 link between UE 401A and UE 401B has been established.

In some examples, the candidate relay UE ID may be a layer-2 ID, a cell radio network temporary identifier (C-RNTI), or a UE ID indicated in a discovery message. For instance, during a UE discovery procedure, UE 401A may receive a discovery message from another UE, which may include an ID of the another UE. UE 401A may report such UE ID in the discovery message to BS 402.

In operation 413, based on the measurement results, BS 402 may determine to switch UE 401A to a target relay. The target relay may be one of the at least one candidate relay UE. For example, in the exemplary procedure 400, the target relay may be UE 401B.

In operation 415, BS 402 may transmit an RRC reconfiguration message to UE 401A. The RRC reconfiguration message may include a path switch indication indicating a switch to the target relay. In some embodiments of the present disclosure, the path switch indication may be indicated by a reconfiguration with sync IE in the RRC reconfiguration message.

In some embodiments of the present disclosure, before transmitting the path switch indication to UE 401A, BS 402 may indicate (hereinafter, "first indication") to UE 401A to establish a connection with the target relay when a PC5 link has not been established between the target relay and UE 401A (not shown in FIG. 4). UE 401A may establish a PC5 link with the target relay in response to the first indication. In response to the PC5 link with the target relay being established, UE 401A may indicate (hereinafter, "second indication") to BS 402 that the PC5 link with the target relay has been established. In some other embodiments of the present disclosure, the establishment of the PC5 link between UE 401A and the target relay may be initiated after the reception of the RRC reconfiguration message.

In some embodiments of the present disclosure, in operation 415' (denoted by dotted line as an option), BS 402 may transmit an RRC reconfiguration message including the parameter(s) associated with UE 401A to UE 401B (i.e., the target relay).

In operation 417, in response to the RRC reconfiguration message, UE 401A may detach the Uu link between UE 401A and BS 402 (also referred to as "source Uu link").

In some embodiments of the present disclosure, in response to the RRC reconfiguration message, UE 401A may also start a mobility timer (e.g., T304 as specified in 3GPP specifications) in operation 417 when a PC5 link with UE 401B has not been established. In other words, when the PC5 link with UE 401B has been established, UE 401A may not start the mobility timer.

In some embodiments of the present disclosure, in response to the RRC reconfiguration message, UE 401A may perform a UE discovery procedure 420 (denoted by dotted block as an option).

For example, in operation 421 of UE discovery procedure 420, UE 401A may transmit a PC5 signaling (PC5-S) message including a discovery message. The discovery message may indicate the ID of the target relay (e.g., UE 401B) configured by BS 402. In some examples, a layer upper than the PC5-S layer (e.g., an application layer) of UE 401A may generate the discovery message, which may be delivered to the PC5-S layer where the PC5-S message is generated. In some cases, the PC5-S message may include information (for example, target relay ID) from the discovery message. In some cases, the discovery message may be encapsulated in the PC5-S message. For example, the PC5-S message may include a container of a discovery message.

In operation 423 of UE discovery procedure 420, UE 401B may transmit a PC5-S response message to UE 401A. In some embodiments of the present disclosure, UE 401B may report the connected UE 401A to BS 402 (not shown in FIG. 4) in the case that UE 401B has not received an RRC reconfiguration message (for example, in operation 415') from BS 402. In some embodiments of the present disclosure, in response to the reception of the PC5-S response message, UE 401A may stop the mobility timer.

In operation 431, a sidelink RRC reconfiguration procedure may be performed to establish a PC5 link between UE 401A and UE 401B.

In some embodiments of the present disclosure, UE 401A may initiate the sidelink RRC reconfiguration procedure after UE 401A discovers UE 401B. Such sidelink RRC reconfiguration procedure may be performed according to an exemplary sidelink RRC reconfiguration procedure 500 shown in FIG. 5.

Figure 5:
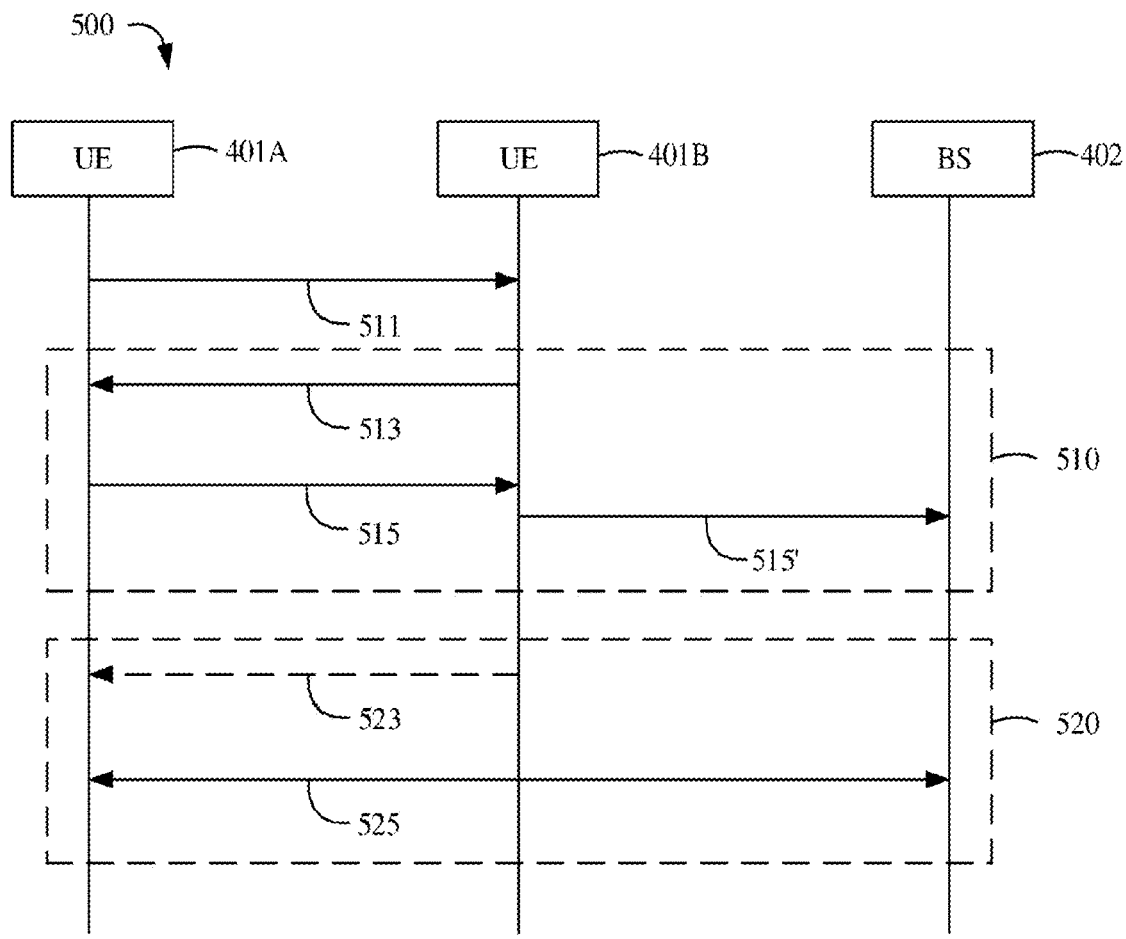
FIG. 5 illustrates an exemplary sidelink RRC reconfiguration procedure in accordance with some embodiments of the present disclosure.

Referring to FIG. 5, in operation 511, in response to discovering UE 401B, UE 401A may transmit an RRC reconfiguration sidelink message to UE 401B to establish a PC5 link with UE 401B, and start a sidelink reconfiguration timer (e.g., T400 as specified in 3GPP specifications). The PC5 link between UE 401A and UE 401B may be successfully established according to procedure 510 or otherwise failed according to procedure 520.

For example, according to procedure 510, in operation 513, UE 401B may transmit an RRC reconfiguration complete sidelink message to UE 401A. In some embodiments of the present disclosure, in response to the RRC reconfiguration complete sidelink message, UE 401A may stop the sidelink reconfiguration timer and the mobility timer.

UE 401A may consider that the path switch is successful in response to the reception of the RRC reconfiguration complete sidelink message when the sidelink reconfiguration timer is running. In operations 515 and 515', UE 401A may transmit an RRC reconfiguration complete message to BS 402 via UE 401B. The RRC reconfiguration complete message may be transmitted based on the configuration provided in the RRC reconfiguration message (e.g., in operation 415 shown in FIG. 4) from the BS 402.

According to procedure 520, in some embodiments of the present disclosure, UE 401A may receive an RRC reconfiguration failure sidelink message from UE 401B in operation 523 (denoted by dotted block as an option). UE 401A may stop the mobility timer and the sidelink reconfiguration timer in response to the reception of the RRC reconfiguration failure sidelink message. In some embodiments of the present disclosure, the sidelink reconfiguration timer may expire before receiving any message from 401B. In some examples, UE 401A may stop the mobility timer in response to the expiry of the sidelink reconfiguration timer. In some embodiments of the present disclosure, UE 401A may not stop the mobility timer in response to the reception of the RRC reconfiguration failure sidelink message or the expiry of the sidelink reconfiguration timer.

In operation 525, in response to the reception of the RRC reconfiguration failure sidelink message, or the expiry of the sidelink reconfiguration timer, or the expiry of the mobility timer, UE 401A may initiate a reestablishment procedure, for example, over the Uu interface. UE 401A may select a suitable cell or a candidate relay and may access the selected cell or relay based on the reestablishment procedure.

Referring back to FIG. 4, in some embodiments of the present disclosure, UE 401B may initiate the sidelink RRC reconfiguration procedure in operation 431 after UE 401B discovers UE 401A. Such sidelink RRC reconfiguration procedure may be performed according to an exemplary sidelink RRC reconfiguration procedure 600 shown in FIG. 6.

Figure 6:
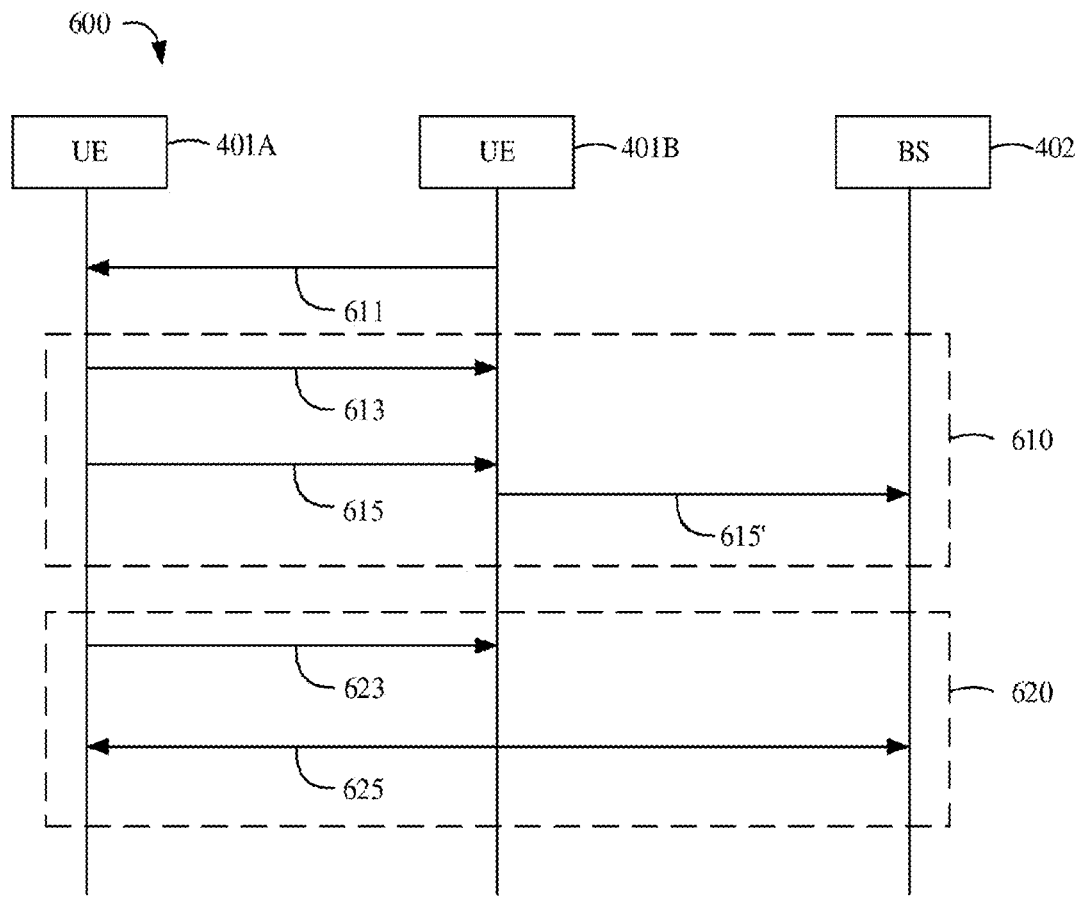
FIG. 6 illustrates an exemplary sidelink RRC reconfiguration procedure in accordance with some embodiments of the present disclosure.

Referring to FIG. 6, in operation 611, in response to discovering UE 401A, UE 401B may transmit an RRC reconfiguration sidelink message to UE 401A to establish a PC5 link with UE 401A, and start a sidelink reconfiguration timer (e.g., T400 as specified in 3GPP specifications). In some embodiments of the present disclosure, in response to the RRC reconfiguration sidelink message, UE 401A may stop the mobility timer.

The PC5 link between UE 401A and UE 401B may be successfully established according to procedure 610 or otherwise failed according to procedure 620.

For example, according to procedure 610, in operation 613, UE 401A may transmit an RRC reconfiguration complete sidelink message to UE 401B. In some embodiments of the present disclosure, in response to the transmission of the RRC reconfiguration complete sidelink message, UE 401A may stop the mobility timer. In operations 615 and 615', UE 401A may transmit an RRC reconfiguration complete message to BS 402 via UE 401B. The RRC reconfiguration complete message may be transmitted based on the configuration provided in the RRC reconfiguration message (e.g., in operation 416 shown in FIG. 4) from the BS 402.

According to procedure 620, in some embodiments of the present disclosure, UE 401A may transmit an RRC reconfiguration failure sidelink message to UE 401B in operation 623. UE 401A may stop the mobility timer in response to the transmission of the RRC reconfiguration failure sidelink message.

In operation 625, in response to the transmission of the RRC reconfiguration failure sidelink message, UE 401A may initiate a reestablishment procedure, for example, over the Uu interface. UE 401A may select a suitable cell or a candidate relay and may access the selected cell or relay based on the reestablishment procedure.

Referring back to FIG. 4, in some embodiments of the present disclosure, in response to the RRC reconfiguration message, UE 401A may not start the mobility timer (e.g., T304 as specified in 3GPP specifications) in any case. In other words, regardless of whether the PC5 link with UE 401B has been established or not, UE 401A may not start the mobility timer in operation 417.

In these embodiments of the present disclosure, during the UE discovery procedure as described above with respect to operation 420, the step of stopping the mobility timer in response to the PC5-S response message may be eliminated since the mobility timer is not started. The sidelink RRC reconfiguration procedure in operation 431 performed with respect to procedure 500 in FIG. 5 or procedure 600 in FIG. 6 may also be modified. The modified procedures will be described in the following text.

For example, referring to FIG. 5, in operation 511, in response to discovering UE 401B, UE 401A may transmit an RRC reconfiguration sidelink message to UE 401B to establish a PC5 link with UE 401B, and start a sidelink reconfiguration timer (e.g., T400 as specified in 3GPP specifications). The PC5 link between UE 401A and UE 401B may be successfully established according to procedure 510 or otherwise failed according to procedure 520.

According to procedure 510, in operation 513, UE 401B may transmit an RRC reconfiguration complete sidelink message to UE 401A. In some embodiments of the present disclosure, in response to the RRC reconfiguration complete sidelink message, UE 401A may stop the sidelink reconfiguration timer.

UE 401A may consider that the path switch is successful in response to the reception of the RRC reconfiguration complete sidelink message when the sidelink reconfiguration timer is running. In operations 515 and 515', UE 401A may transmit an RRC reconfiguration complete message to BS 402 via UE 401B. The RRC reconfiguration complete message may be transmitted based on the configuration provided in the RRC reconfiguration message (e.g., in operation 415 shown in FIG. 4) from the BS 402.

According to procedure 520, in some embodiments of the present disclosure, UE 401A may receive an RRC reconfiguration failure sidelink message from UE 401B in operation 523 (denoted by dotted block as an option). UE 401A may stop the sidelink reconfiguration timer in response to the reception of the RRC reconfiguration failure sidelink message. In some embodiments of the present disclosure, the sidelink reconfiguration timer may expire before receiving any message from 401B.

In operation 525, in response to the reception of the RRC reconfiguration failure sidelink message or the expiry of the sidelink reconfiguration timer, UE 401A may initiate a reestablishment procedure, for example, over the Uu interface. UE 401A may select a suitable cell or a candidate relay and may access the selected cell or relay based on the reestablishment procedure.

Referring to FIG. 6, in operation 611, in response to discovering UE 401A, UE 401B may transmit an RRC reconfiguration sidelink message to UE 401A to establish a PC5 link with UE 401A, and start a sidelink reconfiguration timer (e.g., T400 as specified in 3GPP specifications). The PC5 link between UE 401A and UE 401B may be successfully established according to procedure 610 or otherwise failed according to procedure 620.

For example, according to procedure 610, in operation 613, UE 401A may transmit an RRC reconfiguration complete sidelink message to UE 401B. UE 401A may consider that the path switch is successful in response to the reception of the RRC reconfiguration sidelink message or the transmission of the RRC reconfiguration complete sidelink message. In operations 615 and 615', UE 401A may transmit an RRC reconfiguration complete message to BS 402 via UE 401B. The RRC reconfiguration complete message may be transmitted based on the configuration provided in the RRC reconfiguration message (e.g., in operation 416 shown in FIG. 4) from the BS 402.

According to procedure 620, in some embodiments of the present disclosure, UE 401A may transmit an RRC reconfiguration failure sidelink message to UE 401B in operation 623. In operation 625, in response to the transmission of the RRC reconfiguration failure sidelink message, UE 401A may initiate a reestablishment procedure, for example, over the Uu interface. UE 401A may select a suitable cell or a candidate relay and may access the selected cell or relay based on the reestablishment procedure.

It should be appreciated by persons skilled in the art that the sequence of the operations in exemplary procedures 400, 500, and 600 may be changed and some of the operations in exemplary procedures 400, 500, and 600 may be eliminated or modified, without departing from the spirit and scope of the disclosure. For example, although in FIG. 4, operation 415' is shown after operation 415, it should be appreciated by persons skilled in the art that operation 415' can occur before, after, or at the same time as operation 415.

In the above embodiments, UE 401A may detach the source Uu link in response to the path switch indication from the BS. In the case that a PC5 link with the target relay fails to be established, UE 401A may need to initiate a reestablishment procedure. Embodiments of the present disclosure provide further solutions for performing a path switch procedure with a fallback mechanism. For example, a UE may not detach the source Uu link in response to the path switch indication, and may fall back to the source Uu link when the UE fails to access the target relay.

Figure 7:
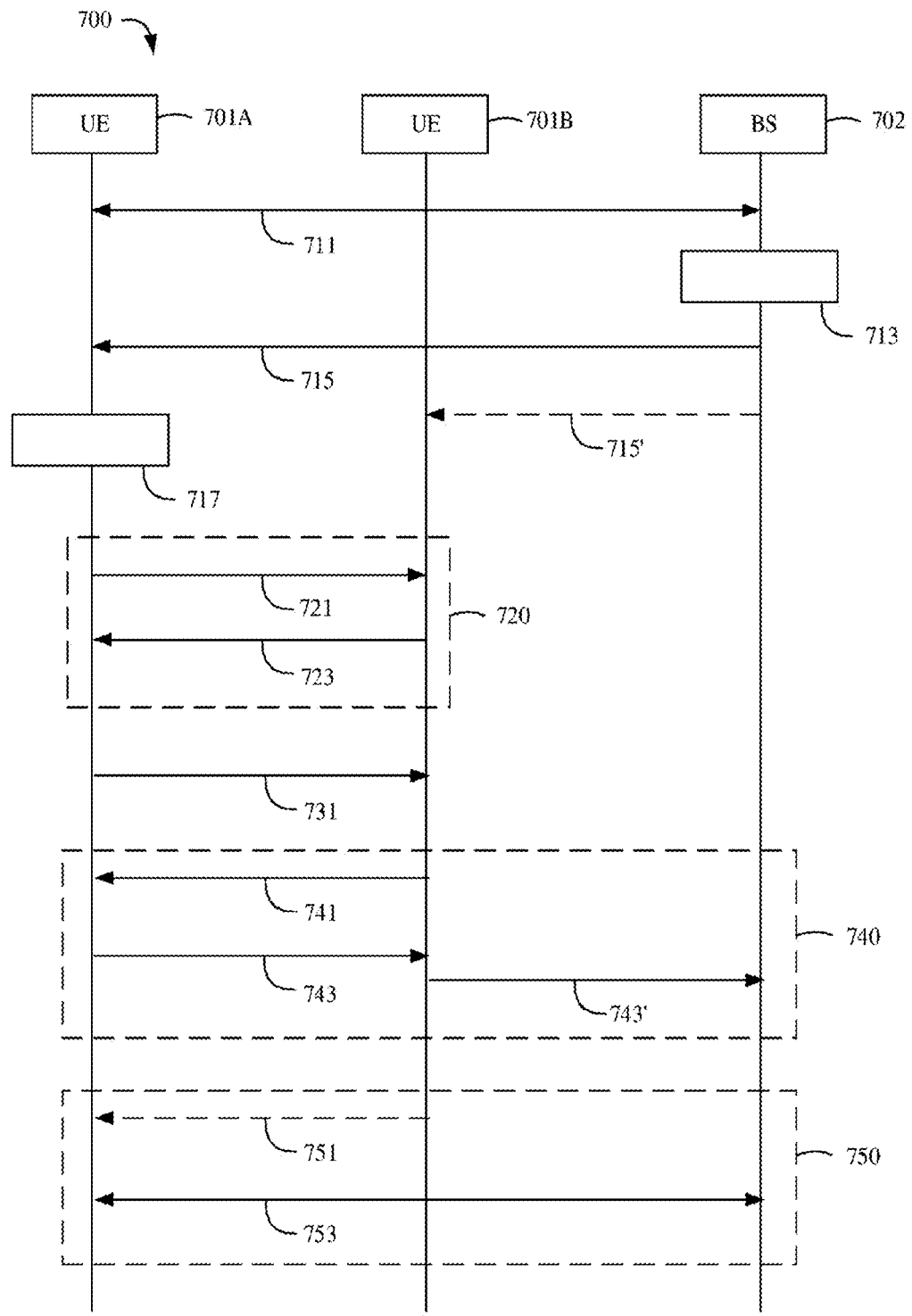
FIG. 7 illustrates an exemplary path switch procedure in accordance with some embodiments of the present disclosure.

FIG. 7 illustrates an exemplary path switch procedure 500 in accordance with some embodiments of the present disclosure. Details described in all of the foregoing embodiments of the present disclosure are applicable for the embodiments shown in FIG. 7.

Referring to FIG. 7, at the beginning, both UE 701A and UE 701B are accessing BS 702. UE 701A may be configured with a measurement configuration by BS 702. In operation 711, UE 701A may report corresponding measurement results to BS 702.

In some embodiments of the present disclosure, UE 701A may report at least one candidate relay UE (e.g., UE 701B) based on the measurement configuration. In some examples, UE 701A may report the candidate relay UE(s) after UE 701A measures and/or discovers the candidate relay UE(s). In some examples, the report may indicate at least one of: the identity (ID) of the at least one candidate relay UE, sidelink channel quality (e.g., reference signal received power (RSRP)) information between UE 701A and the at least one candidate relay UE, whether a PC5 link with (some or all of) the at least one candidate relay UE has been established or not. For example, UE 701A may report the ID of UE 701B, the sidelink channel quality information between UE 701A and UE 701B, and/or whether a PC5 link between UE 701A and UE 701B has been established.

In some examples, the candidate relay UE ID may be a layer-2 ID, a cell radio network temporary identifier (C-RNTI), or a UE ID indicated in a discovery message. For instance, during a UE discovery procedure, UE 701A may receive a discovery message from another UE, which may include an ID of the another UE. UE 701A may report such UE ID in the discovery message to BS 702.

In operation 713, based on the measurement results, BS 702 may determine to switch UE 701A to a target relay. The target relay may be one of the at least one candidate relay UE. For example, in the exemplary procedure 700, the target relay may be UE 701B.

In operation 715, BS 702 may transmit an RRC reconfiguration message to UE 701A. The RRC reconfiguration message may include a path switch indication indicating a switch to the target relay. In some embodiments of the present disclosure, the path switch indication may be indicated by a reconfiguration with sync IE in the RRC reconfiguration message.

In some embodiments of the present disclosure, before transmitting the path switch indication to UE 701A, BS 702 may indicate (hereinafter, "first indication") to UE 701A to establish a connection with the target relay when a PC5 link has not been established between the target relay and UE 701A (not shown in FIG. 7). UE 701A may establish a PC5 link with the target relay in response to the first indication. In response to the PC5 link with the target relay being established, UE 701A may indicate (hereinafter, "second indication") to BS 702 that the PC5 link with the target relay has been established. In some other embodiments of the present disclosure, the establishment of the PC5 link between UE 701A and the target relay may be initiated after the reception of the RRC reconfiguration message.

In some embodiments of the present disclosure, in operation 715' (denoted by dotted line as an option), BS 702 may transmit an RRC reconfiguration message including the parameter(s) associated with UE 701A to UE 701B (i.e., the target relay).

In operation 717, in response to the RRC reconfiguration message, UE 701A may not detach the Uu link between UE 701A and BS 702 (also referred to as "source Uu link"). In other words, UE 701A may maintain the source Uu link. In some examples, UE 701A may continue to transmit data, signaling, or both to BS 702. In some examples, UE 701A may continue to receive data, signaling, or both from the BS In some embodiments of the present disclosure, in response to the RRC reconfiguration message, UE 701A may start a mobility timer (e.g., T304 as specified in 3GPP specifications). In some examples, UE 701A may start the mobility timer when a PC5 link with UE 701B has not been established, and may not start the mobility timer when a PC5 link with UE 701B has been established. In some examples, UE 701A always starts the mobility timer regardless of whether a PC5 link with UE 701B has been established or not.

In some embodiments of the present disclosure, in response to the RRC reconfiguration message, UE 701A may perform a UE discovery procedure 720 (denoted by dotted block as an option).

For example, in operation 721 of UE discovery procedure 720, UE 701A may transmit a PC5 signaling (PC5-S) message including a discovery message. The discovery message may indicate the ID of the target relay (e.g., UE 701B) configured by BS 702. The discovery message and the PC5-S message may be generated according to the method described above with respect to FIG. 4.

In operation 723 of UE discovery procedure 720, UE 701B may transmit a PC5-S response message to UE 701A. In some embodiments of the present disclosure, in response to the reception of the PC5-S response message, UE 701A may stop the mobility timer, detach the source Uu link, or both. In some embodiments of the present disclosure, UE 701B may report the connected UE 701A to BS 702 (not shown in FIG. 7) in the case that UE 701B has not received an RRC reconfiguration message (for example, in operation 715') from BS 702.

In some embodiments of the present disclosure, UE 701A may initiate a sidelink RRC reconfiguration procedure to establish a PC5 link with UE 701B after UE 701A discovers UE 701B. For example, in operation 731, in response to discovering UE 701B, UE 701A may transmit an RRC reconfiguration sidelink message to UE 701B, and start a sidelink reconfiguration timer (e.g., T400 as specified in 3GPP specifications).

The PC5 link between UE 701A and UE 701B may be successfully established according to procedure 740 or otherwise failed according to procedure 750.

According to procedure 740, in operation 741, UE 701B may transmit an RRC reconfiguration complete sidelink message to UE 701A. In some embodiments of the present disclosure, in response to the reception of the RRC reconfiguration complete sidelink message, UE 701A may consider that the path switch is successful and may stop the sidelink reconfiguration timer. In some embodiments of the present disclosure, in response to the RRC reconfiguration complete sidelink message, UE 701A may perform at least one of: stopping the mobility timer and detaching the source Uu link.

In operations 743 and 743', UE 701A may transmit an RRC reconfiguration complete message to BS 702 via UE 701B. The RRC reconfiguration complete message may be transmitted based on the configuration provided in the RRC reconfiguration message (e.g., in operation 715 shown in FIG. 7) from the BS 702.

According to procedure 750, in some embodiments of the present disclosure, UE 701A may receive an RRC reconfiguration failure sidelink message from UE 701B in operation 751 (denoted by dotted block as an option). UE 701A may stop the mobility timer and the sidelink reconfiguration timer in response to the reception of the RRC reconfiguration failure sidelink message. In some embodiments of the present disclosure, the sidelink reconfiguration timer may expire before receiving any message from 701B. In some examples, UE 701A may stop the mobility timer in response to the expiry of the sidelink reconfiguration timer. In some embodiments of the present disclosure, UE 701A may not stop the mobility timer in response to the reception of the RRC reconfiguration failure sidelink message or the expiry of the sidelink reconfiguration timer.

In operation 753, in response to the reception of the RRC reconfiguration failure sidelink message, or the expiry of the sidelink reconfiguration timer, or the expiry of the mobility timer, UE 701A may fall back to the source Uu link. In some embodiments of the present disclosure, UE 701A may transmit a path switch failure indication to BS 702. In some embodiments of the present disclosure, UE 701A may report measurement results for one or more cells, one or more candidate relays or both to BS 702 along with the path switch failure indication.

In some embodiments of the present disclosure, BS 702 may transmit another RRC reconfiguration message including a path switch indication to UE 701A. The path switch indication may indicate a switch to a different or the same target relay (hereinafter, "new target relay"). The path switch indication may be indicated by a reconfiguration with sync IE in the another RRC reconfiguration message.

Then, the UE 701A, the new target relay, and BS 702 may perform another path switch procedure as described above. For example, similar to operation 717, in response to the another RRC reconfiguration message, UE 701A may start or restart the mobility timer. Similar to procedure 720, UE 701A may perform a UE discovery procedure and may discover the new target relay. Similar to operation 731 and procedure 740 or 750, UE 701A may try to establish a PC5 link with the new target relay.

It should be appreciated by persons skilled in the art that the sequence of the operations in exemplary procedure 700 may be changed and some of the operations in exemplary procedure 700 may be eliminated or modified, without departing from the spirit and scope of the disclosure.

For example, although in FIG. 7, the mobility timer may be started in response to the RRC reconfiguration message, it should be appreciated by persons skilled in the art that the mobility timer may not be started. In this case, the subsequent operation may be modified accordingly. Although in FIG. 7, UE 701A initiates the sidelink RRC reconfiguration procedure to establish the PC5 link with UE 701B, it should be appreciated by persons skilled in the art that UE 701B may initiate the sidelink RRC reconfiguration procedure according to procedure 600 shown in FIG. 6.

Figure 8:
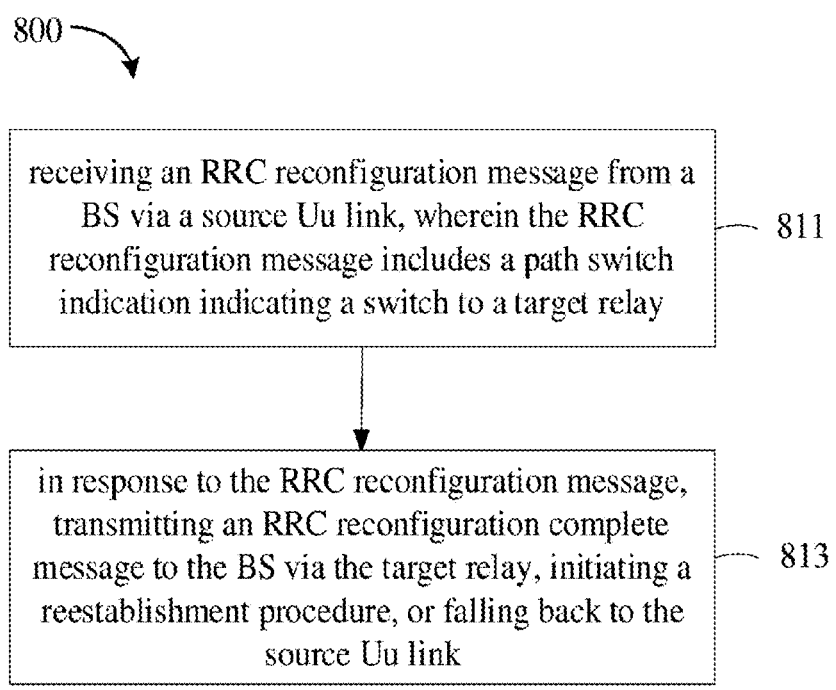
FIG. 8 illustrates an exemplary path switch procedure in accordance with some embodiments of the present disclosure.

FIG. 8 illustrates an exemplary path switch procedure 800 in accordance with some embodiments of the present disclosure. Details described in all of the foregoing embodiments of the present disclosure are applicable for the embodiments shown in FIG. 8. In some examples, the procedure may be performed by a UE, for example, UE 401A in FIG. 4-6 or UE 701A in FIG. 7.

Referring to FIG. 8, a Uu link between a UE and a BS (also referred to as "source Uu link") has been established. In operation 811, the UE may receive an RRC reconfiguration message from the BS via the source Uu link. The RRC reconfiguration message may include a path switch indication indicating a switch to a target relay. Descriptions of the path switch indication as described above may apply here. For example, the path switch indication may be indicated by a reconfiguration with sync IE.

In operation 813, the UE may transmit an RRC reconfiguration complete message to the BS via the target relay, initiate a reestablishment procedure, or fall back to the source Uu link, in response to the RRC reconfiguration message.

In some embodiments of the present disclosure, the UE may transmit, to the BS, a report indicating an ID of at least one candidate relay UE and whether a PC5 link with the at least one candidate relay UE has been established or not. In some examples, the target relay may be one of at least one candidate relay UE. Descriptions of the UE ID as described above may apply here. For example, the ID of the at least one candidate relay UE may be a layer-2 ID, a cell radio network temporary identifier (C-RNTI), or a UE ID indicated in a discovery message from the at least one candidate relay UE.

In some embodiments of the present disclosure, the UE may receive an indication (first indication) from the BS. The first indication may indicate to establish a PC5 link with the target relay. In response to the first indication, the UE may establish the PC5 link with the target relay. In response to the PC5 link with the target relay being established, the UE may transmit, to the BS, another indication (second indication) indicating that the PC5 link with the target relay has been established. The BS may transmit the above-mentioned RRC reconfiguration message in response to the second indication. In other words, the UE may receive the above-mentioned RRC reconfiguration message after transmitting the second indication.

In some embodiments of the present disclosure, in response to the RRC reconfiguration message, the UE may detach the source Uu link with the BS and may start a mobility timer, as described above with respect to FIG. 4. For example, in response to the RRC reconfiguration message, the UE may detach the source Uu link, and start a mobility timer in response to a PC5 link with the target relay has not been established. In some embodiments, the UE may initiate the PC5 link establishment with the target relay, as described above with respect to FIG. 5. In some other embodiments, the target relay may initiate the PC5 link establishment with the UE, as described above with respect to FIG. 6.

For example, the UE may transmit an RRC reconfiguration sidelink message to the target relay in response to discovering the target relay. The UE may also start a sidelink reconfiguration timer. In some cases, the UE may receive an RRC reconfiguration complete sidelink message from the target relay. In response to the RRC reconfiguration complete sidelink message, the UE may consider that the path switch is successful, and may stop the mobility timer. The UE may transmit the RRC reconfiguration complete message in operation 813, in response to the RRC reconfiguration complete sidelink message. In some other cases, the UE may consider that the path switch is failed, and may initiate the reestablishment procedure in operation 813, in response to a reception of an RRC reconfiguration failure sidelink message, or an expiry of the sidelink reconfiguration timer, or an expiry of the mobility timer. In some embodiments, the UE may stop the mobility timer in response the reception of the RRC reconfiguration failure sidelink message or the expiry of the sidelink reconfiguration timer.

In some other examples, the UE may receive an RRC reconfiguration sidelink message from the target relay. In some cases, the UE may transmit an RRC reconfiguration complete sidelink message to the target relay as a response. The UE may consider that the path switch is successful and stop the mobility timer in response to the reception of the RRC reconfiguration sidelink message or the transmission of the RRC reconfiguration complete sidelink message. The UE may transmit the RRC reconfiguration complete message in operation 813, in response to the RRC reconfiguration complete sidelink message. In some other cases, the UE may transmit an RRC reconfiguration failure sidelink message to the target relay. The UE may consider that the path switch is failed and stop the mobility timer in response to the reception of the RRC reconfiguration sidelink message or the transmission of the RRC reconfiguration failure sidelink message. The UE may initiate the reestablishment procedure in operation 813, in response to the transmission of the RRC reconfiguration failure sidelink message.

In some embodiments, in response to the RRC reconfiguration message, the UE may transmit a PC5-S message including a discovery message. Descriptions of the PC5-S message and the discovery message as described above may apply here. The discovery message may indicate an ID of the target relay. The UE may receive a PC5-S response message, and may stop the mobility timer in response to the PC5-S response message.

In some embodiments of the present disclosure, in response to the RRC reconfiguration message, the UE may detach the source Uu link with the BS and may not start a mobility timer, as described above with respect to FIG. 4. In some embodiments, the UE may initiate the PC5 link establishment with the target relay, as described above with respect to FIG. 5. In some other embodiments, the target relay may initiate the PC5 link establishment with the UE, as described above with respect to FIG. 6.

For example, the UE may transmit an RRC reconfiguration sidelink message to the target relay in response to discovering the target relay. The UE may also start a sidelink reconfiguration timer. In some cases, the UE may receive an RRC reconfiguration complete sidelink message from the target relay. The UE may transmit the RRC reconfiguration complete message in operation 813, in response to the RRC reconfiguration complete sidelink message. In some other cases, the UE may consider that the path switch is failed, and may initiate the reestablishment procedure in operation 813, in response to a reception of an RRC reconfiguration failure sidelink message or an expiry of the sidelink reconfiguration timer.

In some other examples, the UE may receive an RRC reconfiguration sidelink message from the target relay. In some cases, the UE may transmit an RRC reconfiguration complete sidelink message to the target relay. The UE may consider that the path switch is successful in response to the reception of the RRC reconfiguration sidelink message or the transmission of the RRC reconfiguration complete sidelink message. The UE may transmit the RRC reconfiguration complete message in operation 813, in response to the RRC reconfiguration complete sidelink message. In some other cases, the UE may transmit an RRC reconfiguration failure sidelink message to the target relay. The UE may consider that the path switch is failed in response to the reception of the RRC reconfiguration sidelink message or the transmission of the RRC reconfiguration failure sidelink message. The UE may initiate the reestablishment procedure in operation 813, in response to the transmission of the RRC reconfiguration failure sidelink message.

In some embodiments, in response to the RRC reconfiguration message, the UE may transmit a PC5-S message including a discovery message. Descriptions of the PC5-S message and the discovery message as described above may apply here. The discovery message may indicate an ID of the target relay. The UE may receive a PC5-S response message as a response.

In some embodiments of the present disclosure, in response to the RRC reconfiguration message, the UE may maintain the source Uu link with the BS and initiate the PC5 link establishment with the target relay, as described above with respect to FIG. 7. For example, in response to the RRC reconfiguration message, the UE may maintain the source Uu link and start a mobility timer.

In some embodiments of the present disclosure, in response to the RRC reconfiguration message, the UE may perform at least one of: continuing to transmit data, signaling, or both to the BS; and continuing to receive data, signaling, or both from the BS. In some embodiments of the present disclosure, in response to the RRC reconfiguration message, the UE may transmit a PC5-S message including a discovery message. Descriptions of the PC5-S message and the discovery message as described above may apply here. The discovery message may indicate an ID of the target relay. The UE may receive a PC5-S response message, and may perform at least one of: stopping the mobility timer and detaching the source Uu link in response to the PC5-S response message.

In some embodiments, the UE may initiate the PC5 link establishment with the target relay. For example, the UE may transmit an RRC reconfiguration sidelink message to the target relay in response to discovering the target relay. The UE may also start a sidelink reconfiguration timer. In some cases, the UE may receive an RRC reconfiguration complete sidelink message from the target relay, and may perform at least one of: stopping the mobility timer and detaching the source Uu link in response to the RRC reconfiguration complete sidelink message. The UE may transmit the RRC reconfiguration complete message in operation 813, in response to the RRC reconfiguration complete sidelink message.

In some other cases, the UE may consider that the path switch is failed, and may fall back to the source Uu link in operation 813, in response to a reception of an RRC reconfiguration failure sidelink message, or an expiry of the sidelink reconfiguration timer, or an expiry of the mobility timer. The UE may transmit a path switch failure indication to the BS; or the UE may transmit both the path switch failure indication and measurement results for at least one of one or more cells and one or more candidate relays to the BS in response to the reception of an RRC reconfiguration failure sidelink message, or the expiry of the sidelink reconfiguration timer, or the expiry of the mobility timer. In some embodiments, the UE may stop the mobility timer in response the reception of the RRC reconfiguration failure sidelink message or the expiry of the sidelink reconfiguration timer.

It should be appreciated by persons skilled in the art that the sequence of the operations in exemplary procedure 800 may be changed and some of the operations in exemplary procedure 800 may be eliminated or modified, without departing from the spirit and scope of the disclosure.

Figure 9:
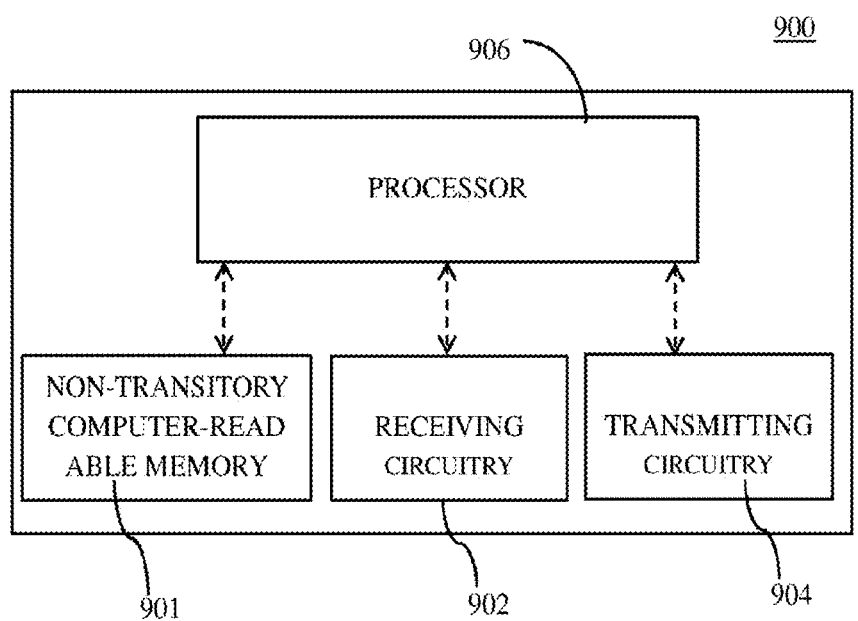
FIG. 9 illustrates a block diagram of an exemplary apparatus in accordance with some embodiments of the present disclosure.

FIG. 9 illustrates a block diagram of an exemplary apparatus 900 according to some embodiments of the present disclosure.

As shown in FIG. 9, the apparatus 900 may include at least one non-transitory computer-readable medium 901, at least one receiving circuitry 902, at least one transmitting circuitry 904, and at least one processor 906 coupled to the non-transitory computer-readable medium 901, the receiving circuitry 902 and the transmitting circuitry 904. The apparatus 900 may be a base station side apparatus (e.g., a BS) or a communication device (e.g., a UE).

Although in this figure, elements such as the at least one processor 906, transmitting circuitry 904, and receiving circuitry 902 are described in the singular, the plural is contemplated unless a limitation to the singular is explicitly stated. In some embodiments of the present application, the receiving circuitry 902 and the transmitting circuitry 904 are combined into a single device, such as a transceiver. In certain embodiments of the present application, the apparatus 900 may further include an input device, a memory, and/or other components.

In some embodiments of the present disclosure, the non-transitory computer-readable medium 901 may have stored thereon computer-executable instructions to cause a processor to implement the method with respect to the UEs as described above. For example, the computer-executable instructions, when executed, cause the processor 906 interacting with receiving circuitry 902 and transmitting circuitry 904, so as to perform the operations with respect to the UEs (e.g., UE 401A or UE 401B in FIG. 4-6, or UE 701A or UE 701B in FIG. 7) described in FIGS. 1-8.

In some embodiments of the present disclosure, the non-transitory computer-readable medium 901 may have stored thereon computer-executable instructions to cause a processor to implement the method with respect to the BSs as described above. For example, the computer-executable instructions, when executed, cause the processor 906 interacting with receiving circuitry 902 and transmitting circuitry 904, so as to perform the operations with respect to the BSs described in FIGS. 1-7.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed:

1. A method performed by a user equipment (UE), the method comprising:
   receiving, a radio resource control (RRC) reconfiguration message from a base station (BS) via a source Uu link, the RRC reconfiguration message including a path switch indication indicating a switch to a target relay;
   starting a mobility timer in response to a PC5 link between the UE and the target relay having not been established;
   starting a sidelink reconfiguration timer in response to attempting to establish the PC5 link between the UE and the target relay; and
   transmitting an RRC reconfiguration complete message to the BS via the target relay in response to receiving the RRC reconfiguration message and a successful establishment of the PC5 link between the UE and the target relay; or
   initiating a reestablishment procedure in response to receiving the RRC reconfiguration message and a failed establishment of the PC5 link between the UE and the target relay, the failed establishment indicated by at least one of a reception of an RRC reconfiguration failure sidelink message, an expiry of the sidelink reconfiguration timer, or an expiry of the mobility timer.

2. The method of claim 1, wherein the path switch indication is indicated by a reconfiguration with sync information element (IE).

3. The method of claim 1, wherein the mobility timer is not started in response to the PC5 link having been established.

4. The method of claim 3, further comprising:
   transmitting an RRC reconfiguration sidelink message to the target relay in response to discovering the target relay;
   receiving an RRC reconfiguration complete sidelink message; and
   in response to the RRC reconfiguration complete sidelink message, stopping the mobility timer.

5. The method of claim 4, wherein transmitting the RRC reconfiguration complete message to the BS via the target relay comprises transmitting the RRC reconfiguration complete message in response to the RRC reconfiguration complete sidelink message.

6. The method of claim 3, further comprising:
   transmitting an RRC reconfiguration sidelink message to the target relay in response to discovering the target relay; and
   receiving an RRC reconfiguration failure sidelink message.

7. The method of claim 6, further comprising:
   stopping the mobility timer in response the reception of the RRC reconfiguration failure sidelink message or the expiry of the sidelink reconfiguration timer.

8. The method of claim 1, further comprising:
   detaching the source Uu link in response to the RRC reconfiguration message.

9. The method of claim 8, further comprising:
   transmitting an RRC reconfiguration sidelink message to the target relay in response to discovering the target relay; and at least one of:
      receiving an RRC reconfiguration complete sidelink message;
      receiving an RRC reconfiguration failure sidelink message; or
      receiving no message before the expiry of the sidelink reconfiguration timer.

10. The method of claim 1, further comprising, in response to the RRC reconfiguration message, at least one of:
   maintaining the source Uu link and starting the mobility timer;
   continuing to transmit data, signaling, or both to the BS; or
   continuing to receive the data, the signaling, or both from the BS.

11. The method of claim 10, further comprising:
   transmitting an RRC reconfiguration sidelink message to the target relay in response to discovering the target relay;
   receiving an RRC reconfiguration complete sidelink message; and
   in response to the RRC reconfiguration complete sidelink message, at least one of stopping the mobility timer or detaching the source Uu link.

12. The method of claim 10, further comprising:
   in response to at least one of a reception of an RRC reconfiguration failure sidelink message, the expiry of the sidelink reconfiguration timer, or the expiry of the mobility timer, transmitting a path switch failure indication to the BS or transmitting both the path switch failure indication and measurement results for at least one of one or more cells and one or more candidate relays to the BS.

13. A user equipment (UE) for wireless communication, comprising:
   at least one memory; and
   at least one processor coupled with the at least one memory and configured to cause the UE to:
      receive a radio resource control (RRC) reconfiguration message from a base station (BS) via a source Uu link, the RRC reconfiguration message including a path switch indication indicating a switch to a target relay;
      starting a mobility timer in response to a PC5 link between the UE and the target relay having not been established;
      starting a sidelink reconfiguration timer in response to attempting to establish the PC5 link between the UE and the target relay; and transmit an RRC reconfiguration complete message to the BS via the target relay in response to receiving the RRC reconfiguration message and a successful establishment of the PC5 link between the UE and the target relay; or initiate a reestablishment procedure in response to receiving the RRC reconfiguration message and a failed establishment of the PC5 link between the UE and the target relay, the failed establishment indicated by at least one of a reception of an RRC reconfiguration failure sidelink message, an expiry of the sidelink reconfiguration timer, or an expiry of the mobility timer.

14. The UE of claim 13, wherein the path switch indication is indicated by a reconfiguration with sync information element (IE).

15. The UE of claim 13, wherein the mobility timer is not started in response to the PC5 link having been established.

16. The UE of claim 15, wherein the at least one processor is configured to cause the UE to:
transmit an RRC reconfiguration sidelink message to the target relay in response to discovering the target relay;
receive an RRC reconfiguration complete sidelink message; and
stop the mobility timer based at least in part on the RRC reconfiguration complete sidelink message.

17. The UE of claim 15, wherein the at least one processor is configured to cause the UE to:
transmit an RRC reconfiguration sidelink message to the target relay in response to discovering the target relay; and
receive the RRC reconfiguration failure sidelink message.

18. The UE of claim 13, wherein the at least one processor is configured to cause the UE to detach the source Uu link in response to the RRC reconfiguration message.

19. The UE of claim 18, wherein the at least one processor is configured to cause the UE to:
transmit an RRC reconfiguration sidelink message to the target relay in response to discovering the target relay; and at least one of:
receive an RRC reconfiguration complete sidelink message;
receive an RRC reconfiguration failure sidelink message; or
receive no message before the expiry of the sidelink reconfiguration timer.

20. The UE of claim 13, wherein, in response to the RRC reconfiguration message, the at least one processor is configured to cause the UE to at least one of:
maintain the source Uu link and start the mobility timer;
continue to transmit data, signaling, or both to the BS; or
continue to receive the data, the signaling, or both from the BS.

* * * * *